: 3,025,179
Patented Mar. 13, 1962

3,025,179
ORGANOPHILIC AND HYDROPHOBIC PIGMENTS AND METHOD FOR THEIR PREPARATION
Raymond Gerard Holbein, Thann, France, assignor to Fabriques de Produits Chimiques de Thann et de Mulhouse, Thann, France, a corporation of France
No Drawing. Filed Mar. 25, 1958, Ser. No. 723,670
Claims priority, application France Mar. 28, 1957
14 Claims. (Cl. 106—300)

The present invention relates to pigments easily wetted by organic compounds such as solvents, paint vehicles and plastic material of various kinds and to methods for their preparation.

As it is generally known it is difficult to incorporate most pigments in paint compositions. Prolonged and expensive grinding is therefore necessary to obtain a thorough dispersion of these pigments. Even so, such dispersions are often of such poor stability that, on storage, the pigment may settle as a deposit which is not easy to suspend again. Paints prepared with such pigments generally lack fluidity a fact which limits the amount of pigment that can be incorporated without imparting too high a viscosity to the paint compositions. Also, paint films containing such pigments are usually lacking in homogeneity, gloss and smoothness. These drawbacks vary with the nature of the associated vehicle even where a given pigment is used. They are especially noticeable when mineral pigments such as lithopone, zinc oxide or titanium dioxide, either rutile or anatase, are used with vehicles containing large amounts of synthetic resins. All these drawbacks are essentially due to the lack of physical compatibility between these pigments and the non polar organic substances associated therewith.

Mineral pigments such as lithopone, zinc oxide, titanium dioxide and the like usually present a hydrophilic surface, i.e. a surface easily wetted by water in which they can be readily dispersed. This property, the "hydrophilic" nature, usually is tantamount to a difficult wetting by organic liquids, such as carbon tetrachloride, benzene, fatty or mineral oils and the like. Therefore, it is difficult, or even impossible, to obtain stable dispersions of hydrophilic pigments in such organic solvents. These pigments may be called "organophobic." Other pigments by their nature are easily wetted by organic media and do not give rise to the problems encountered with the organophobic pigments or at least involve such problems to a much lesser degree. Pigments easily wetted by, and dispersed in, organic solvents may be called "organophilic." The latter are usually difficultly wetted by water and thus are named "hydrophobic."

Paints containing organophilic pigments show other advantages in addition to easy preparation. For example, oil absorption of the pigment is noticeably reduced. Due to better wetting of the pigment by the vehicle, the paint film is more firmly held together, i.e., less porous and its protecting effect is increased. An association of an organophilic and hydrophobic pigment with a suitable vehicle will produce wholly hydrophobic paint films which prove highly resistant to water and outside exposure. Such films are especially resistant to degradation by sea water when compared to films containing hydrophilic pigments.

Emulsified paints consist of a stable dispersion of a pigment and a resinous binder in an aqueous medium. After the evaporation of the water the paint film is formed by agglutination of the remaining components. Such a film will be tight and glossy only if the pigment is perfectly compatible with the resinous binder. Indeed the resin must fill all the interstices between the pigment particles and consequently must come in close contact with most of the pigment surface which requires thorough wetting abilities between the pigment and the resin. Otherwise, the film will be of a loose texture, shows a dull surface and offers a poor protection.

Various pigments are incorporated in a great number of plastic materials for coloring or other purposes. For the reasons explained above organophilic pigments are particularly suited for incorporation in such plastic material.

Organophilic and hydrophobic pigments also find wide uses in the preparation of printing inks. These inks consist of a liquid of organic nature in which a pigment is dispersed. They must be very opaque and therefore require a high pigment to vehicle ratio and nevertheless must remain sufficiently fluid for the inking process. In this connection organophilic pigments present great advantages. Furthermore, an hydrophobic pigment is highly desirable especially in lithography where only inks of strongly hydrophobic properties can be used successfully.

Synthetic fibers are obtained by extrusion of organic polymer substances either molten or dissolved in a suitable solvent. These fibers are usually delustered by incorporating a white pigment in the plastic mass to be extruded. In this case organophilic pigments offer a very great advantage owing to an excellent dispersion which is a determining condition for the tensile strength and the uniformity of the fibers.

Other uses for organophilic and hydrophobic pigments will be found in the preparation of cosmetic and pharmaceutic compositions of a greasy nature and also in numerous cleaning and preserving preparations such as, for instance, the pastes for white leathers and fabrics which are made of a suspension of white pigments in organic vehicles.

The present invention relates to the preparation of pigment of high organophilic and hydrophobic properties. More specifically it relates to the preparation of titanium dioxide containing pigments having organophilic and hydrophobic properties which are further characterized by high tinting strength, excellent brightness while also showing exceptional resistance to chalking, to yellowing by light and to baking discoloration when incorporated in paint compositions.

Numerous processes have been disclosed for imparting organophilic and hydrophobic properties to various substances and more specifically to pigments which normally lack these properties or possess them only to a very unsatisfactory degree. These processes usually apply to mineral pigments but may also be used for the treatment of certain colored organic pigments, which owing to the presence of highly polar functions in their molecule, are only weakly organophilic. Among the substances mentioned above are, for instance, titanium dioxide (either anatase or rutile) metal titanates, zirconium oxide, zirconium, blanc fixe (barium sulfate), magnesium silicate, clays, lithopone, barium carbonate, silica, aluminium silicates, zinc sulfide, zinc oxide, antimony oxide, white lead, aluminium oxide, magnesium fluoride, carbon black, ultramarine blue, chrome yellow, basic zinc chromate, chrome red, chrome orange, barium chromate, chrome green, prussian blue, lakes of acid dyes precipitated on aluminium oxide and similar products.

All of these known processes have as their objective a coating of the pigments with a thin layer of an "active substance" which imparts to the pigment organophilic and hydrophobic properties. This coating is sometimes referred to as a monomolecular film. The "active substances" used are characterized by being non-polar hydrophobic molecules having strongly polar substituents attached thereon. The basic non-polar molecules are always hydrocarbon residues and generally, but not necessarily, are of an aliphatic nature. It is generally assumed that these molecules are deposited on the surface of the pigment with their polar substituents in close contact with that surface. Under these conditions the non-polar hydrocarbon radicals are forced, or repelled, away from the pigment to "active substance" interface. Thus the outer surface of the pigment particle plus "active substance" consists of hydrocarbon radicals and for this reason the particle acts in dispersion media as if it were entirely of a hydrocarbon nature; i.e., the particle is typically organophilic and hydrophobic.

Various substances have been described for use as "active substance" such as: higher molecular fatty acids i.e., acids with more than 8 carbon atoms and their salts; resinic acids and their salts; naphthenic acids and their salts; waxes; sulphonated vegetal or animal oils; lipoids like cholesterol, lecithin etc.; isocyanates with a long carbon chain; long chain amines and their derivatives; long chain quaternary ammonium salts; and long carbon chain products of the following types: betains, sulphonium and phosphonium salts; phthalic acid and its derivatives; substituted thioureas; metallic dialkyldithiocarbamates; rubber vulcanisation accelerators: substituted polysiloxanes; polymerizable alkylated methylolmelamines.

"Active substances" of another type include compounds containing a hydrocarbon radical associated with a substituent capable of reacting with mobile hydrogen atoms especially those belonging to hydroxyl groups which may exist on the pigment surface or may have been created thereon by suitable means. Among these substances are: acid anhydrides, acylchlorides, aliphatic and aromatic isocyanates, organosubstituted chlorosilanes and organosubstituted alkoxysilanes.

In fact while it is relatively easy to select a suitable "active substance" it is quite difficult to obtain an even coating thereof on the surface of the pigment particles.

Processes have been suggested by which the pigment is dispersed in an organic solvent containing the "active substance" in solution. After this treatment the solvent is removed by evaporation and the pigment is disintegrated by mechanical means. These prior art processes are expensive due to the unavoidable solvent losses. Furthermore the treatment of large amounts of pigments by such processes involve serious health and fire hazards. In the case of titanium dioxide pigment, there often develops a yellow discoloration during the solvent evaporation which, as in the case of toluene, requires temperatures as high as 120° C. for complete elimination of the solvent. Moreover this type of process meets with an unavoidable inherent difficulty. The pigment to be treated is organophobic and therefore repellent to the solvent in which it is not adequately dispersed. Numerous pigment particles remain in an agglomerated state and consequently are not fully coated by the "active substance," this results in an incomplete treatment i.e., an heterogeneous product. It has therefore been suggested to perform this type of treatment in grinding mills in the presence of organic solvents, which is, of course, an expensive operation.

In other prior art processes, the treatment with the "active substance" takes place in an aqueous medium. The "active substance" is added as an aqueous solution to a slurry of the pigment in water. Under these conditions the "active substance" associates with the pigment due to its affinity for the pigment to which it confers the desired properties. The water is then removed and the pigment is disintegrated. Such a method gives irregular results and it has been recognized that special dispositions must be taken to insure uniform coating of all the particles. An improvement has been suggested which consists in adding a dispersing agent to the pigment slurry before the treatment with the active substance. In other words, the pigment is first made strongly hydrophilic to secure its dispersion in water. The so dispersed pigment will offer the whole surface of its particles to the "active substance" treatment. This results in a uniform and reproducible coating treatment by the "active substance."

In the specific case of titanium dioxide pigments it has been suggested to add the "active substance" to a pigment which has been previously "surface treated." Surface treated pigments mean pigments treated by processes in which the individual particles of the pigment are coated with a thin film of a colorless mineral surface treating and coating compound. For instance, hydrous oxides or some other compounds of Al, Mg, Zn, Ti, Zr, Ce, etc. have been suggested. These surface treatments improve the pigmentary properties of the titanium dioxide coated with such compounds.

Also, according to a known process, a titanium dioxide pigment is surface treated as referred to above, then washed, filtered and dried. Afterwards it is rendered organophilic by treatment with an "active substance" in an organic solvent.

It is an object of the present invention to provide a process for treating mineral pigments, and especially titanium dioxide pigments, in a novel and simple manner with both "active substances" and mineral surface treating agents. It is another object of the present invention to produce highly organophilic and hydrophobic pigments from pigmentary particles which do not possess these properties. Another object of the invention is the production of titanium dioxide with highly improved pigmentary properties. Still another object of the invention is to perform the treatment of pigmentary particles with an "active substance" and with a mineral treating agent without intermediate washing and drying.

In using the process hereinafter described in greater detail the advantages previously separated obtained by two distinct treatments are fully secured by a single treatment. The "active substance" in the treatments of this invention is well fixed on the pigment. In some cases, and quite unexpectedly, advantages due to the mineral coating are enhanced when compared to the results obtained by known mineral coating processes. This was made possible by applying to the pigment first the treatment by the "active substance" and only subsequently the treatment by metallic salts.

In brief, the method according to this invention, consists in dispersing the pigment in water in the presence of a dispersing agent, adding to this suspension the "active substance" conferring organophilic properties and adding to the mixed dispersion obtained a solution of a metal salt capable of giving a mineral coating and simultaneously suppressing the action of the dispersing agent. Subsequently the product is, as usual, neutralized, filtered, washed, dried and disintegrated.

The conventional titanium dioxide production processes generally include a hydroclassification step after the grinding of the calcined product. Accordingly, in the present invention, a suspension of such hydroclassified pigment will preferably, but not necessarily, be used as the material to be treated. In certain cases an adjustment of the concentration of the pigment and/or of the dispersing agent in that hydroclassified suspension may be useful.

Some of the positive benefits of this invention may be obtained by using pigment suspensions free of dispersing agents. But it has been observed that the results are so much better and more regular since the dispersion is more perfect that the use of dispersing agents is highly useful. The amount of dispersing agent to be employed depends primarily on the chemical nature of this agent, but must also be varied according to the nature of the pigment to be treated. Usually the required amount will be between 0.03% to 3% by weight of the dry pigment.

According to the present invention, the selection of the appropriate dispersing agent is directed by the necessity of compatibility with the "active substance," it being required that the dispersion remains stable after additions of the "active substance." Furthermore, the dispersing agent should not disturb the action of the metal salt to be added in the third step. On the contrary, it is desirable that the dispersing agent contribute with the metal salt to produce additional improvements of the pigmentary properties. Alkaline reacting alkali metal salts have proven especially suitable as dispersing agents for mineral pigments. In the case of titanium dioxide, soluble silicates, especially sodium and potassium silicates, are especially suitable as dispersing agents. Good results have also been obtained by using alkali metal phosphates and polyphosphates such as pyrophosphates or mixtures of gum arabic and saccharose.

"Active substances" conferring to the pigments the desired organophilic properties are numerous, such as are mentioned before. When selecting the appropriate "active substance" the following limitations should be taken into account: it should be compatible with the dispersing agent used, it should adhere tightly to the considered pigment and, moreover, it should show good resistance to the destructive agents to which the pigment is likely to be exposed such as outside conditions, heat, light, chemicals, etc. It is advantageous to add the "active substance" in the form of a fine dispersion in an aqueous medium: either as a true, or colloidal, solution; or as a solution in a water miscible solvent; or as an aqueous emulsion of the "active substance" either as such or dissolved in a water immiscible solvent.

All the products specified above as "active substances" may be used according to the present invention. Two classes of substances have been found particularly suitable:

(a) The alkali metal salts of the higher fatty acids, of resinic acids, and of naphthenic acids wherein all are used as aqueous solutions or as aqueous sols.

(b) Mono and disubstituted polysiloxanes.

These compounds, commonly named silicones, are polymers characterized by the following chain unit

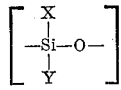

wherein X may be hydrogen or an organic substituent and wherein Y is an organic substituent. The organic substituents X and Y are alkyl, alkenyl, aryl or aralkyl radicals. Such polysiloxanes in some cases may contain in the same molecule different types of chain units responding to the same general formula but bearing different substituents. In the course of the specification these compounds are named polyorganosiloxanes. Typical polyorganosiloxanes are for example: polyhydrogenomethylsiloxane, polydimethylsiloxane, polymethylallylsiloxane, polymethylphenylsiloxane, polymethylbenzylsiloxane. All these substances are water insoluble and for that reason are used in form of stable aqueous emulsion in the process of the invention.

While noticeable results may in some cases be obtained by using as little as 0.1% of "active substance," the usual amount employed lies between 0.5% to 2% based on the dry weight of the pigment. It is, however, possible in special cases to fix up 5% "active substance" on the pigment. Obviously, the necessary quantity of "active substance" depends largely upon the surface area of the pigment, i.e. essentially on the mean particle diameter. The figures given above are those for particles in the one micron range. If desired, a mixture of several "active substances" may be used, in this case the total weight of these substances amounts to the above given figures.

It is important that the dispersion containing the pigment and the "active substance" is a stable one in order to secure a uniform action of the metal salt added in the next step. This is the case if dispersing agent and "active substance" are compatible. As previously mentioned, water insoluble "active substances" are advantageously used in form of aqueous emulsions. In these cases care must be taken to avoid that the emulsion is made up with emulsifiers which would be incompatible with the dispersing agent of the first step. Otherwise it would be difficult, if not impossible, to secure an even distribution of the "active substance" on the pigment and still more difficult to insure a proper action of the metal salt added in the next step. Anionic, cationic or non ionic emulsifiers may be used and experiment will permit selection of the most suitable, the primary criterion being the stability of the pigment plus the "active substance" in the mixed dispersion. In order to secure a perfect distribution thereof, the "active substance" will preferably be added progressively to the pigment suspension under good stirring and mixing will be continued as long as necessary.

In the next step, a metal salt capable of depositing on the surface of the pigment a layer of a colorless metal compound is added to the mixed dispersion obtained as described. Salts of the following metals may be used: aluminum, magnesium, zinc, titanium, zirconium, the metals of the rare earths group, tin, antimony, and lead, as well as mixtures of salts of one or several of these metals. As an example, in practical applications soluble salts of aluminum will secure excellent results. Salts of the other specified metals may be used in a like manner. The addition of the metal salt, advantageously as an aqueous solution, will preferably be done progressively and under good stirring with the stirring continued for some time. The action of the added metal salt is considered to be of a varied nature. First, by its hydrolitic decomposition, the salt liberates acidity which lowers the pH of the suspension thus decreasing the action of the alkaline dispersing agents present. The hydrolysis results in the formation of hydrous metal oxides which are deposited on the pigment surface in common with the "active substance" and generally at least part of the dispersing agent. If sodium silicate, for example, has been used as dispersing agent and aluminum sulfate as the metal salt, both silica and alumina will ultimately be found on the surface of the pigment together with the "active substance." Although it does not seem possible to prove the formation of a definite compound between the dispersing agent and the hydrous metal oxide; an intimate association of these two compounds does take place on the surface of the pigment. As a result, the dispersing agent is irreversibly removed and thus the strongly hydrophilic nature which it conferred to the pigment for its dispersion in the aqueous medium, irreversibly disappears.

The amount of metal salt to be used depends on the nature of this salt and possibly also on the nature of the dispersing agent. This amount is substantially the same as usually employed in the preparation of surface treated pigments. Appreciable results can be obtained with 0.2% of metal salt, but usually 0.5% to 3% are employed. These figures are given in weight percent of the corresponding metal oxide on the basis of dry pigment. Larger amounts may also be used, such as for example 10%, but usually such large quantities do not result in further improvement of the pigmentary qualities. If a mixture of several metal salts is used, these figures refer to the total amount of the corresponding oxides.

Especially in the case of titanium dioxide, the formation on the surface of the pigments of a hydrous metal oxide and/or its products of interaction with dispersing agents such as, for example, as alkali metal silicates or polyphosphates, results in improvements of the pigmentary properties of the pigment. It is known that some improvements can be obtained under similar conditions in the absence of an "active substance," but pigments prepared in this manner lack organophilic properties. However, it was not obvious that this beneficial effect would still be obtained if the treatment by metal salts is done on a pigment suspension already containing an "active substance" distributed therein. It is surprising indeed that each of the two treating agents, added in the indicated order, produces fully its own effect without disturbing the other's action. One might have thought that the presence of the "active substance" would prevent the normal action of the added metal salt on the surface of the pigment. Quite surprisingly this is not the case and it can be seen that in addition to its normal action the formation of the metal compound deposit contributes to a better binding of the "active substance" to the pigment particles. It is not possible to recognize on the surface of the pigment particles two distinct and successive layers of "active substance" first and then of metal compounds. On the contrary, it seems that these two substances are intermixed in such a manner as to force the non-polar hydrocarbon chains of the "active substance" from the surface of the treated pigment particles comprising: pigment plus "active substance" plus metal compound and dispersing agent residues. The exact manner by which these components are linked together is not definitely known, and is not part of the invention which is characterized by the successive steps of the process in the order described and by the beneficial results obtained.

After the metal salt has been uniformly distributed through the suspension, the pigment is further processed as known in the art, i.e., neutralized, washed free of soluble salts, filtered, dried and disintegrated. The drying will be done at temperatures usually applied for ordinary surface treated pigments. In some cases the temperature rise during the drying steps will act favorably on the organophilic properties of the pigment. This will be the case when use is made of such "active substances" which are favorably modified by heating as, for instance, towards a higher degree of polymerization, or polycondensation, as in the case of alkylated methylolmelamines.

The process and products of this invention are illustrated further by the following examples, but the invention is not limited thereto or to their specific disclosures.

EXAMPLE 1

One thousand (1,000) kg. of anatase $TiO_2$ pigment is slurried with 5,000 liters of cold water in the presence of sufficient sodium silicate to raise the pH to 9 (use is made of about 15 to 25 liters of a solution containing 320 g. per liter of solid and having a $SiO_2/Na_2O$ ratio of about 3/1. This solution is well stirred and a solution of 5 kg. sodium stearate in 250 liters of water is added thereto over a period of 15 minutes. (The sodium stearate solution may be prepared at a boiling temperature, a slight turbidity may develop on cooling but has no effect on the final results.) After 10 minutes of continued stirring, a progressive addition is made of 130 kg. of hydrated aluminum sulfate $$(Al_2(SO_4)_3 \cdot 18H_2O)$$

dissolved in 400 liters of water. Stirring is continued for 30 minutes and then the pH is adjusted to 7 by addition of caustic soda, followed by separating the water by filtering or other appropriate means, and by washing the coated pigment and drying at 120° C. The disintegrated product eventually obtained is a white powder which is easily wetted by organic solvents such as benzene.

EXAMPLE 2

One thousand (1,000) kg. of a rutile $TiO_2$ pigment (hydroclassified to a maximum particle size of 2 microns) is suspended in 5,000 liters of water in the presence of 20 liters of a sodium silicate solution having a composition identical to that used in Example 1. To the thoroughly mixed slurry, an aqueous solution of 5 kg. sodium abietate is added. After 10 minutes continuous stirring an addition is made of 130 kg. of hydrated aluminum sulfate 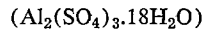 $(Al_2(SO_4)_2 \cdot 18H_2O)$ dissolved in 400 liters of water. Stirring is continued for 30 minutes and then the suspension is neutralized by means of caustic soda.

After filtering, washing, drying at 115° C. and disintegrating; a pigment is obtained showing the same organophilic properties as those obtained according to Example 1.

EXAMPLE 3

Example 2 is repeated with the difference that the aluminum sulfate solution is replaced by a mixture of 300 liters of aluminum sulfate solution having a concentration of 50 g. $Al_2O_3$ per liter and 200 liters of a zinc sulfate solution adjusted to a concentration of 25 g. ZnO per liter.

The obtained pigment, after drying and disintegration, also shows strong organophilic properties.

EXAMPLE 4

One thousand (1,000) kg. of $TiO_2$ anatase pigment is dispersed in 5,000 liters of water containing about 20 liters of the sodium silicate solution referred to in Example 1 so as to obtain a final pH value of 9. When the pigment is thoroughly dispersed by stirring, addition is made to the dispersion of 20 liters of an aqueous emulsion containing 33% of silicone (in this case, emulsion "Si 35 B"; this is a 33% aqueous emulsion of polydimethylsiloxane in the presence of a non-ionic emulsifying agent). After 20 minutes' stirring, 400 liters of an aluminum sulphate solution at a concentration of 50 g. $Al_2O_3$ per liter is added progressively. Stirring is continued for 30 minutes and then the slurry is neutralized by means of caustic soda, filtered, the pigment washed, dried at 130° C. and disintegrated. A white pigment is obtained showing strongly hydrophobic and organophilic properties. When spread on water the pigment is not wetted but floats indefinitely on the surface. When stirred with equal quantities of water and benzene the pigment collects entirely in the benzene layer.

EXAMPLE 5

The Example 4 is repeated with the same quantity of hydroclassified rutile titanium oxide of which the particles with a diameter of over 2 microns have been eliminated. The pigment obtained shows the same organophilic and hydrophobic characteristics as that of Example 4.

EXAMPLE 6

The operation described in Example 4 is repeated, but without adding the silicone emulsion. When stirred with equal quantities of water and benzene, the pigment is dispersed in the water only.

EXAMPLE 7

The operation described in Example 5 is repeated but without adding the silicone emulsion. In the presence of water and benzene, the pigment obtained is also dispersed in water as in Example 6.

EXAMPLE 8

One disperses 1,000 kg. of calcined rutile $TiO_2$, hydroclassified in 5,000 liters of water, in the presence of 20 liters of a solution containing 300 grams per liter of sodium silicate (having a ratio $SiO_2/Na_2O$ of 3/1) and adjusting the pH to a value of 9 by adding caustic soda. After a thorough agitation to assure a good dispersion, one adds over a period of 10 minutes, and under thorough agitation, 35 liters of an aqueous emulsion containing 15% of a polydimethylsiloxane. The polydimethylsiloxane is emulsified with 5% of its weight of an arylsubstituted polyglycolether. After 15 minutes of agitation, one adds, during a period of 25 minutes, 400 liters of a solution of aluminum sulfate and titanium sulfate having a respective concentration corresponding to 40 grams $Al_2O_3$ and 25 grams $TiO_2$ per liter. After the solution of sulfate is well distributed in the mass, one neutralizes by the addition of caustic soda, then filters off the water, washes the pigment, and dries it at 130° C. The obtained pigment is strongly organophilic and hydrophobic, and in addition, it is characterized by its high tinting strength and its exceptional resistance to chalking.

While various proportions of aluminum sulfate and titanium sulfate may be used in the process of this example, respective amounts corresponding to 0.1 to 2.5% $Al_2O_3$ and 0.1 to 2.5% $TiO_2$, based on the weight of pigment used, have proven especially advantageous.

The pigmentary properties of the product obtained in the Examples 1 to 8 are compared in the Table 1 with the properties of untreated anatase (A) and untreated rutile (R) pigments used in the Examples 1 to 8. These crude pigments A and R are conventionally prepared by the so-called sulphate process, calcined, and milled as usual.

Table 1

| | (A) | (R) | Ex. 1 | Ex. 2 | Ex. 3 | Ex. 4 | Ex. 5 | Ex. 6 | Ex. 7 | Ex. 8 |
|---|---|---|---|---|---|---|---|---|---|---|
| Brightness | 12.3 | 11.5 | 12.3 | 11.8 | 11.8 | 13.0 | 12.3 | 13.0 | 12.0 | 12.1 |
| Tinting strength | 135 | 190 | 135 | 240 | 230 | 140 | 250 | 135 | 230 | 250 |
| Resistance to discoloration by ultra-violet light | lit | med | pas | good | good | good | v. gd | lit | good | v. gd. |
| Resistance to chalking | lit | med | pas | good | good | good | v. gd | lit | good | exc. |
| Resistance to marine atmosphere | lit | pas | med | good | good | v. gd | exc | lit | med | exc. |
| Hydrophobic properties | none | none | good | good | good | v. gd | exc | none | none | exc. |
| Resistance of paints to settling | med | med | good | good | good | exc | exc | med | med | exc. |
| Organophilic properties | lit | lit | good | good | good | v. gd | exc | lit | lit | exc. |

In the table, the increasing value in any quality is expressed by the expressions: none, little (lit.), passable (pas.), medium (med.), good, very good (v. gd.), excellent (exc.).

The brightness indicates a measure showing the reflectance and whiteness of the pigment. Greater brightness is shown by higher figures. Greater tinting strength is also shown by the higher figures. Good surface treated rutile pigments have a tinting strength of 230.

An examination of Table 1 shows that the product of Examples 5 and 8 are characterized by a tinting strength and brightness superior to that of non-organophilic corresponding products (Example 7) or corresponding organophilic products prepared with aliphatic fatty acid salts (Example 2). It appears that the rutile-type titanium dioxides treated according to our new process, i.e., using silicone emulsions as "active substances" have exceptionally high tinting strength and brightness. This improvement in the tinting strength and brightness could not be expected.

The new method illustrated in the previous examples, relating to titanium dioxide, may be successfully used for the preparation of other organophilic and hydrophobic pigments from pigments not already possessing these properties, as it is shown by the following examples.

EXAMPLE 9

One thousand (1,000) kg. of pigmentary zinc oxide are dispersed in 8,000 liters of water by adding caustic soda as dispersing agent so as to obtain the pH 9. After thorough stirring, a solution of 5 kg. of sodium laurate in 500 liters of water is added to the dispersion. After a good distribution of the sodium laurate has been reached, 300 liters of an aluminum sulfate, containing 50 g./l. as $Al_2O_3$, are added. After 15 minutes' stirring, the pigment is washed and, the water being filtered off, it is dried at 110° C., and disintegrated. The obtained pigment is easily dispersed in oils and organic solvents.

In the process illustrated in Example 10, one customarily uses in proportion to the amount of pigment used from 0.1 to 2% of the polyorganosiloxane and an amount of aluminum sulfate corresponding to 0.2 to 3% of $Al_2O_3$.

EXAMPLE 10

The operation of the Example 9 is repeated, but using instead of sodium laurate, 22 liters of the silicone emulsion "Si 35 B" used in the Example 4. The zinc oxide which is obtained is strongly organophilic, and, when agitated in presence of equal quantities of benzene and water, it is dispersed in the organic phase only.

EXAMPLE 11

One thousand (1,000) kg. of lithopone is suspended in 5,000 liters of water containing 4 kg. of sodium pyrophosphate. After good stirring, addition is made of 5 kg. of hard olive oil soap (known as "Marseille soap") tempered in tepid water. After 30 minutes' stirring to ensure proper distribution of the soap, 400 liters of aluminum sulfate solution, containing 50 grams per liter expressed as $Al_2O_3$, are added. The pigment which is obtained, after being neutralized by sodium carbonate, washed, filtered and dried at 110° C., is characterized by its affinity for oils and organic solvents.

This invention has been illustrated by a number of specific disclosures and a number of specific examples exemplifying the practice of the invention. It will be understood, however, that various departures from details used in describing and illustrating the invention may be made without departing from the scope of the invention as defined in the appended claims.

What is claimed:

1. A method of treating pigments to impart to them improved properties including both hydrophobic and organophilic properties, which comprises forming in an aqueous medium a dispersion of the pigment to be treated and of an organic substance having a non-polar hydrophobic radical carrying a polar substituent, said substance being selected from the group consisting of mono- and di-substituted polysiloxanes and alkali metal salts of higher fatty acids, resinic acids and naphthenic acids and mixtures thereof, said substance being dispersed in the medium in a quantity of from 0.1% to 5.0% based on the dry weight of the pigment and sufficient to impart both hydrophobic and organophilic properties to the pigment, then incorporating into said dispersion a solution of at least one metal salt selected from the group consisting of water soluble salts of aluminum, magnesium, zinc, titanium, zirconium, tin, antimony, lead and rare earth metals, in an amount providing a quantity of said salt between 0.2% and 10% of the dry weight of the pigment sufficient to enhance surface properties of the pigment, and thereafter separating the pigment from said medium to obtain a product possessing said improved properties.

2. A method of treating pigments to impart to them improved properties including both hydrophobic and organophilic properties, which comprises forming in an alkaline aqueous medium a dispersion of the pigment to be treated and of an organic substance having a non-polar hydrophobic radical carrying a polar substituent, said substance being selected from the group consisting of mono- and di-substituted polysiloxanes and alkali metal salts of higher fatty acids, resinic acids and naphthenic acids and mixtures thereof, said substance being dispersed in the medium in a quantity of from 0.1% to 5.0% based on the dry weight of the pigment and sufficient to impart both hydrophobic and organophilic properties to the pigment, then incorporating into said dispersion a solution of at least one metal salt selected from the group consisting of water soluble salts of aluminum, magnesium, zinc, titanium, zirconium, tin, antimony, lead and rare earth metals, in an amount providing a quantity of said salt between 0.2% and 10% of the dry weight of the pigment sufficient to enhance surface properties of the pigment, neutralizing said medium, and thereafter separating the pigment from said medium to obtain a product possessing said improved properties.

3. A method of treating pigments to impart to them improved properties including both hydrophobic and organophilic properties, which comprises forming in an aqueous medium a dispersion of the pigment to be treated and a polyorganosiloxane, said siloxane being dispersed in the medium in a quantity of from 0.1% to 5.0% based on the dry weight of the pigment and sufficient to impart both hydrophobic and organophilic properties to the pigment, then incorporating into said dispersion a solution of at least one metal salt selected from the group consisting of water soluble salts of aluminum, magnesium, zinc, titanium, zirconium, tin, antimony, lead and rare earth metals, in an amount providing a quantity of said salt between 0.2% and 10% of the dry weight of the pigment sufficient to enhance surface properties of the pigment, and thereafter separating the pigment from said medium to obtain a product possessing said improved properties.

4. A method of treating pigments to impart to them improved properties including both hydrophobic and organophilic properties, which comprises forming in an aqueous medium a dispersion of the pigment to be treated and of at least one salt selected from the group consisting of alkali metal salts of higher fatty acids, resin acids, and naphthenic acids, said salt being dispersed in the medium in a quantity of from 0.1% to 5.0% based on the dry weight of the pigment and sufficient to impart both hydrophobic and organophilic properties to the pigment, then incorporating into said dispersion a solution of at least one metal salt selected from the group consisting of water soluble salts of aluminum, magnesium, zinc, titanium, zirconium, tin, antimony, lead and rare earth metals, in an amount providing between 0.2% and 10% of said metal salt, based on the dry weight of the pigment, and sufficient to enhance surface properties of the pigment, and thereafter separating the pigment from said medium to obtain a product possessing said improved properties.

5. A method of treating pigments to impart to them improved properties including both hydrophobic and organophilic properties, which comprises forming in an aqueous medium a dispersion of the pigment to be treated and of an organic substance having a non-polar hydrophobic radical carrying a polar substituent, said substance being selected from the group consisting of mono- and di-substituted polysiloxanes and alkali metal salts of higher fatty acids, resinic acids and naphthenic acids and mixtures thereof, said substance being dispersed in the medium in a quantity between 0.5 and 2% of the weight of the pigment, then incorporating into said dispersion a solution of at least one metal salt selected from the group consisting of water soluble salts of aluminum, magnesium, zinc, titanium, zirconium, tin, antimony, lead and rare earth metals, in an amount providing a quantity of said salt between 0.5 and 3% of the weight of the pigment, and thereafter separating the pigment from said medium to obtain a product possessing said improved properties.

6. A method of treating pigments to impart to them improved properties including both hydrophobic and organophilic properties, which comprises forming in an alkaline aqueous medium a dispersion of the pigment to be treated and of an organic substance having a non-polar hydrophobic radical carrying a polar substituent, said substance being selected from the group consisting of mono- and di-substituted polysiloxanes and alkali metal salts of higher fatty acids, resinic acids and naphthenic acids and mixtures thereof, said substance being dispersed in the medium in a quantity between 0.5 and 2% of the weight of the pigment, then incorporating into said dispersion a solution of at least one metal salt selected from the group consisting of water soluble salts of aluminum, magnesium, zinc, titanium, zirconium, tin, antimony, lead and rare earth metals, in an amount providing a quantity of said salt between 0.5 and 3% of the weight of the pigment, neutralizing said medium, and thereafter separating the pigment from said medium to obtain a product possessing said improved properties.

7. A method of treating pigments to impart to them improved properties including both hydrophobic and organophilic properties, which comprises suspending the pigment to be treated in an aqueous solution of at least one alkaline-reacting alkali metal salt, adding to and dispersing in the resulting suspension an organic substance having a non-polar hydrophobic radical carrying a polar substituent, said substance being selected from the group consisting of mono- and di-substituted polysiloxanes and alkali metal salts of higher fatty acids, resinic acids and naphthenic acids and mixtures thereof, said substance being dispersed in the aqueous medium in a quantity of from 0.1% to 5.0% based on the dry weight of the pigment and sufficient to impart both hydrophobic and organophilic properties to the pigment, then incorporating into said dispersion a solution of at least one metal salt selected from the group consisting of water soluble salts of aluminum, magnesium, zinc, titanium, zirconium, tin, antimony, lead and rare earth metals, in an amount providing a quantity of said salt between 0.2% and 10% of the dry weight of the pigment sufficient to enhance surface properties of the pigment, and thereafter separating the pigment from said medium to obtain a product possessing said improved properties.

8. A method of treating mineral pigments to impart to them improved properties including both hydrophobic and organophilic properties, which comprises suspending the pigments to be treated in an aqueous solution of 0.03 to 3.0%, by weight of the pigment, of at least one alkaline-reacting alkali metal compound selected from the group consisting of alkali metal silicates, alkali metal phosphates, alkali metal polyphosphates, and alkali metal hydroxides, adding and dispersing in the resulting suspension an organic substance having a non-polar hydrophobic radical carrying a polar substituent, said substance being selected from the group consisting of mono- and di-substituted polysiloxanes and alkali metal salts of higher fatty acids, resinic acids and naphthenic acids and mixtures thereof, said substance being dispersed in the aqueous medium in a quantity between .1 and 5% of the weight of the pigment, then incorporating into said dispersion a solution of at least one metal salt selected from the group consisting of water soluble salts of aluminum, magnesium, zinc, titanium, zirconium, tin, antimony, lead and rare earth metals, in an amount providing a quantity of said salt between .2 and 10% of the weight of the pigment, neutralizing said medium, and thereafter separating the pigment from said medium to obtain a product possessing said improved properties.

9. A method of treating titanium dioxide pigments to impart to them improved properties including both hydrophobic and organophilic properties, which comprises suspending the pigments to be treated in an aqueous solution of 0.03 to 3.0%, by weight of the pigment, of at least one alkaline-reacting alkali metal compound selected from the group consisting of alkali metal silicates, alkali metal phosphates, alkali metal polyphosphates, and alkali metal hydroxides, adding and dispersing in the resulting suspension an organic substance having a non-polar hydrophobic radical carrying a polar substituent, said substance being selected from the group consisting of mono- and di-substituted polysiloxanes and alkali metal salts of higher fatty acids, resinic acids and naphthenic acids and mixtures thereof, said substance being dispersed in the medium in a quantity between 0.5 and 2% of the weight of the pigment, then incorporating into said dispersion a solution of at least one metal salt selected from the group consisting of water soluble salts of aluminum, magnesium, zinc, titanium, zirconium, tin, antimony, lead and rare earth metals, in an amount providing a quantity of said salt between 0.5 and 3% of the weight of the pigment, neutralizing said medium, and thereafter separating the pigment from said medium to obtain a product possessing said improved properties.

10. A method of treating titanium dioxide pigments to impart to the improved properties including both hydrophobic and organophilic properties, which comprises suspending the pigments to be treated in an aqueous solution of 0.03 to 3.0%, by weight of the pigment, of at least one alkaline-reacting alkali metal compound selected from the group consisting of alkali metal silicates, alkali metal phosphates, alkali metal polyphosphates, and alkali metal hydroxides, adding and dispersing in the resulting suspension an aqueous emulsion of a polyorganosiloxane, said siloxane being dispersed in the medium in a quantity between .1 and 5% of the weight of the pigment, then incorporating into said dispersion a solution of aluminum sulfate in an amount providing a quantity of said salt between .2 and 10% of the weight of the pigment, neutralizing said dispersion, and thereafter separating the pigment from said medium to obtain a product possessing said improved properties.

11. Finely divided pigment particles carrying in co-deposition on their surfaces products of the treatment of the particles, in a common aqueous medium, first with .1 to 5%, by weight of the pigment, of a dispersed organic substance having a non-polar hydrophobic radical carrying a polar substituent, said substance being selected from the group consisting of mono- and di-substituted polysiloxanes and alkali metal salts of higher fatty acids, resinic acids and naphthenic acids and mixtures thereof, and thereafter with .2 to 10%, by weight of pigment, of a dispersion of at least one water soluble metal salt selected from the group consisting of water soluble salts of aluminum, magnesium, zinc, titanium, zirconium, tin, antimony, lead and rare earth metals, said pigment particles being both hydrophobic and organophilic.

12. Finely divided mineral pigment particles carrying in co-deposition on their surfaces products of the treatment of the particles, in a common aqueous medium, first with .1 to 5%, by weight of the pigment, of an organic substance having a non-polar hydrophobic radical carrying a polar substituent, said substance being selected from the group consisting of mono- and di-substituted polysiloxanes and alkali metal salts of higher fatty acids, resinic acids and naphthenic acids and mixtures thereof, dispersed in an alkaline aqueous medium, and thereafter with .2 to 10%, by weight of the pigment, of a dispersion of at least one water soluble metal salt selected from the group consisting of water soluble salts of aluminum, magnesium, zinc, titanium, zirconium, tin, antimony, lead and rare earth metals, said pigment particles being both hydrophobic and organophilic.

13. Finely divided titanium dioxide pigment particles carrying in co-deposition on their surfaces products of the treatment of the particles, in a common aqueous medium, first with .1 to 5%, by weight of pigment, of a dispersed polyorganosiloxane, and thereafter with .2 to 10%, by weight of the pigment, of a dispersion of at least one water soluble metal salt, selected from the group consisting of water soluble salts of aluminum, magnesium, zinc, titanium, zirconium, tin, antimony, lead and rare earth metals, said pigment particles being hydrophobic and organophilic.

14. Finely divided titanium dioxide pigment particles carrying in co-deposition on their surfaces products of the treatment of the particles, while dispersed in an aqueous solution of 0.03 to 3% of alkali metal silicate, by weight of the pigment, first with 0.1 to 2% by such weight of a polyorganosiloxane in aqueous dispersion and thereafter with 0.2 to 3% by such weight of aluminum sulfate in aqueous solution, said pigment particles being hydrophobic and organophilic.

References Cited in the file of this patent

UNITED STATES PATENTS

| | | |
|---|---|---|
| 2,296,618 | Patterson | Sept. 22, 1942 |
| 2,346,188 | Robertson | Apr. 11, 1944 |
| 2,387,534 | Seidel | Oct. 23, 1945 |
| 2,610,167 | Te Grotenhuis | Sept. 9, 1952 |
| 2,615,006 | Lane | Oct. 21, 1952 |
| 2,717,246 | Kienle et al. | Sept. 6, 1955 |
| 2,891,875 | Phreaner | June 23, 1959 |